United States Patent
Hall (10) Patent No.: US 9,417,814 B1
(45) Date of Patent: Aug. 16, 2016

(54) TEMPERED PACING OF SHINGLED MAGNETIC STORAGE DEVICES

(71) Applicant: HGST Netherlands B.V., Amsterdam (NL)

(72) Inventor: David Hall, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/620,397

(22) Filed: Feb. 12, 2015

(51) Int. Cl.
 *G11B 5/09* (2006.01)
 *G06F 3/06* (2006.01)

(52) U.S. Cl.
 CPC .............. *G06F 3/0653* (2013.01); *G06F 3/061* (2013.01); *G06F 3/0604* (2013.01); *G06F 3/0676* (2013.01)

(58) Field of Classification Search
 None
 See application file for complete search history.

(56) References Cited

U.S. PATENT DOCUMENTS

| | | | |
|---|---|---|---|
| 8,122,216 B2 | 2/2012 | Daly et al. | |
| 8,681,443 B2 | 3/2014 | Hall | |
| 8,699,162 B1* | 4/2014 | Grobis et al. | 360/48 |
| 8,922,925 B1* | 12/2014 | Coker et al. | 360/48 |
| 8,941,943 B1* | 1/2015 | Coker et al. | 360/75 |
| 8,947,817 B1* | 2/2015 | Chung et al. | 360/55 |
| 9,269,376 B1* | 2/2016 | Hess | G11B 5/012 |
| 2012/0102261 A1 | 4/2012 | Burger et al. | |
| 2013/0007380 A1 | 1/2013 | Seekins et al. | |
| 2013/0246703 A1* | 9/2013 | Bandic et al. | 711/113 |
| 2013/0321948 A1* | 12/2013 | Bandic et al. | 360/75 |
| 2014/0006707 A1 | 1/2014 | Bandic et al. | |
| 2014/0029126 A1* | 1/2014 | Nitta et al. | 360/31 |
| 2014/0285923 A1* | 9/2014 | Aoki | 360/97.12 |
| 2015/0082084 A1* | 3/2015 | Guyot et al. | 714/15 |
| 2015/0106568 A1* | 4/2015 | Feldman et al. | 711/122 |
| 2015/0160882 A1* | 6/2015 | Coker et al. | 360/31 |

OTHER PUBLICATIONS

Gibson et al. "Directions for Shingled-Write and Two-Dimensional Magnetic Recording System Architectures: Synergies with Solid-State Disks." Carnegie Mellon University Parallel Data Lab Technical Report, CMU-PDL-09-104. May 2009.

* cited by examiner

*Primary Examiner* — Tan X Dinh (57) ABSTRACT

To provide enhanced operation of data storage devices and systems, various systems, apparatuses, methods, and software are provided herein. In a first example, a data storage device is provided that includes storage media comprising a shingled magnetic recording (SMR) storage region. The data storage device also includes a storage control system configured to receive write operations and responsively store write data in a first storage region prior to transferring into the SMR storage region. The storage control system is configured to determine a reporting pace for transferring the write operations from the first storage region into the SMR storage region, the reporting pace establishing a target performance that is tempered from storage of the write data into the first storage region. The storage control system is configured to report completion of the write operations over a host interface at the reporting pace.

20 Claims, 7 Drawing Sheets

TEMPERED PACING OF SHINGLED MAGNETIC STORAGE DEVICES

TECHNICAL FIELD

Aspects of the disclosure are related to the field of data storage and hard disk drives in data storage systems.

TECHNICAL BACKGROUND

Computer and network systems such as personal computers, workstations, server systems, and cloud storage systems, typically include data storage elements for storing and retrieving data. These data storage elements can include data storage devices, such as hard disk drives, solid state storage devices, hybrid storage devices, tape storage devices, and other mass storage devices. Manufacturers of data storage devices typically manufacture different grades of data storage devices that can have different performance characteristics, such as throughput rates, transaction buffer sizes, rotation rates for rotating magnetic media, or latencies, among other characteristics.

As computer systems and networks grow in numbers and capability, there is a need for more and more storage capacity. Cloud computing and large-scale data processing systems have further increased the need for digital data storage systems capable of transferring and holding immense amounts of data. Data centers can include a large quantity of data storage devices in various rack-mounted and high-density storage configurations.

These high-density storage configurations might employ a variety of storage devices using different storage technologies. One such storage technology includes data storage drives with shingled magnetic recording (SMR) technology to increase storage densities on associate storage media. SMR technology physically overlaps adjacent data tracks on a magnetic storage media, in contrast to a non-overlapping recording technology, such as parallel magnetic recording (PMR). However, differences in host-side throughputs of data storage drives that include SMR technology can lead to unpredictable performance for individual data storage drives and thus unpredictable performance for the large number of data storage drives within a storage facility.

OVERVIEW

To provide enhanced operation of data storage devices and systems, various systems, apparatuses, methods, and software are provided herein. In a first example, a data storage device is provided. The data storage device includes storage media comprising a first storage region and a shingled magnetic recording (SMR) storage region. The data storage device also includes a storage control system configured to receive storage operations transferred over a host interface that comprise write operations for storage of write data on the storage media and responsively store the write data in the first storage region prior to transferring into the SMR storage region. The storage control system is configured to determine a reporting pace for transferring the write operations from the first storage region into the SMR storage region, the reporting pace establishing a target performance that is tempered from storage of the write data into the first storage region. The storage control system is configured to report completion of the write operations over the host interface at the reporting pace.

In another example, a method of operating a data storage device is presented. The method includes receiving storage operations transferred over a host interface that comprise write operations for storage of write data on the storage media and responsively storing the write data in a first storage region of the storage media prior to transferring into a SMR storage region of the storage media. The method also includes determining a reporting pace for reporting transfer of the write operations from the first storage region into the SMR storage region, the reporting pace establishing a target performance that is tempered from storage of the write data into the first storage region. The method also includes reporting completion of the write operations over the host interface at the reporting pace.

In another example, a data storage system is presented. The data storage system includes a plurality of data storage devices configured to receive storage operations for storage and retrieval of data on associated storage media, each of the associated storage media comprising a magnetic recording (SMR) storage region. Each of the plurality of data storage devices comprise a storage control system configured to receive associated storage operations transferred by a host system that comprise write operations for storage of write data on the storage media and responsively store the write data in a first storage region prior to transferring into the SMR storage region. The storage control system is configured to determine a reporting pace for reporting transfer of the write operations from the first storage region into the SMR storage region, the reporting pace establishing a target performance that is tempered from storage of the write data into the first storage region to normalize performance across ones of the plurality of data storage devices. The storage control system is configured to report completion of the write operations at the reporting pace.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

High-density magnetic storage devices employ a variety of storage technologies. One such storage technology includes rotating data storage drives with shingled magnetic recording (SMR) technology. SMR technology allows for read/write heads to physically overlap adjacent data tracks on the storage media, in contrast to a non-overlapping recording technology, such as parallel magnetic recording (PMR). However, devices that employ SMR technology can lead to "bursty" performance for random writes and slower performance for fragmented reads. The bursty performance can result from using a temporary storage region or exception region on the storage media that doesn't employ SMR techniques. This temporary storage region can be used to store data quickly before archival into the SMR regions, and allows for a fast treatment of write data from the perspective of host systems. In many examples, random writes to a device that employs SMR techniques can occur more rapidly than an equivalent device that employs PMR techniques, in part due to use of this temporary storage region.

Faster performance for random writes might be desirable in some situations. However, when these devices are employed in a large data center with many drives operating concurrently, the bursty nature of these many drives can lead to difficulties from the perspective of the host systems. Specifically a host system might be less able to predict performance and maintain steady flow of data to drives that use SMR techniques. Also, device-to-device variation in a large data center can produce difficulties in data transfer, process scheduling, and power consumption estimation by associated data systems. In the examples herein, temperance management is employed to throttle reporting of random write completions to mediate a burst performance throughput of the data storage devices and provide more consistent performance for host systems.

Figure 1:
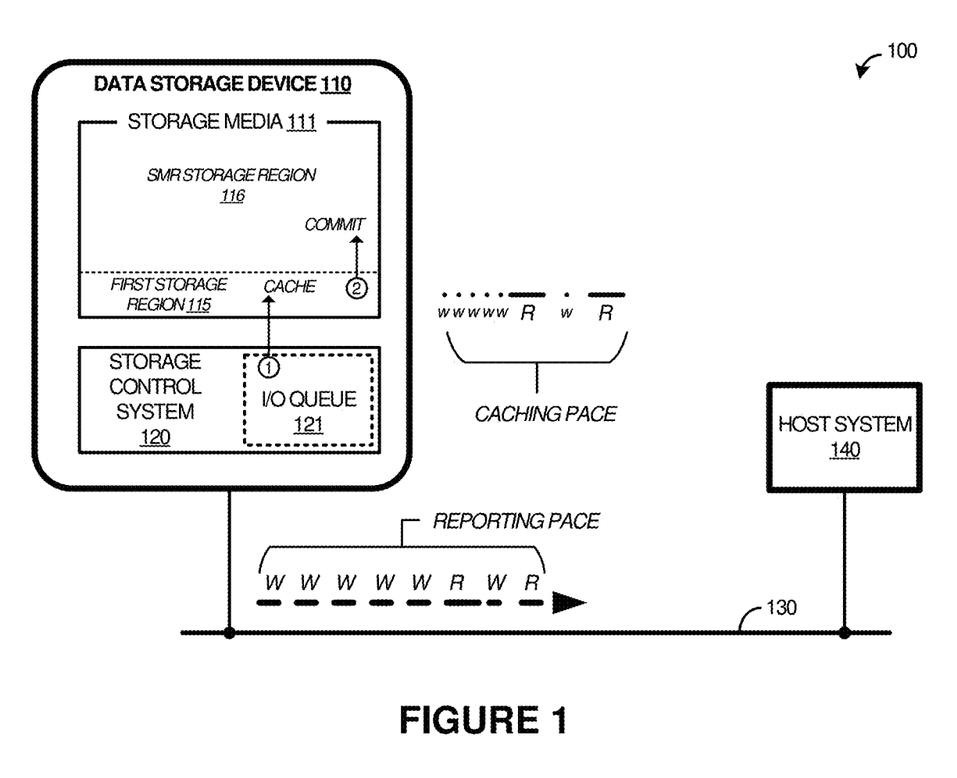
FIG. 1 is a system diagram illustrating a data system.

In a first example of temperance management in data storage devices, FIG. 1 is presented. FIG. 1 is a system diagram illustrating data system 100. System 100 includes data storage device 110 and host system 140. Data storage device 110 and host system 140 communicate over storage interface 130. Data storage device 110 includes data storage elements comprising one or more rotating storage media 111. Data storage device 110 also includes input/output (I/O) queue 121 for caching storage operations received from host system 140, and storage control system 120 to control the operations of data storage device 110.

In operation, data storage device 110 receives read or write transactions over storage interface 130 issued by host system 140. Responsive to read transactions, data storage device 110 can retrieve data stored upon storage media 111 for transfer to host system 140. Responsive to write transactions, data storage device 110 stores data onto storage media 111. It should be understood that other components of data storage device 110 are omitted for clarity in FIG. 1, such as read/write heads, armatures, preamps, transceivers, processors, amplifiers, motors, servos, enclosures, and other electrical and mechanical elements.

Figure 2:
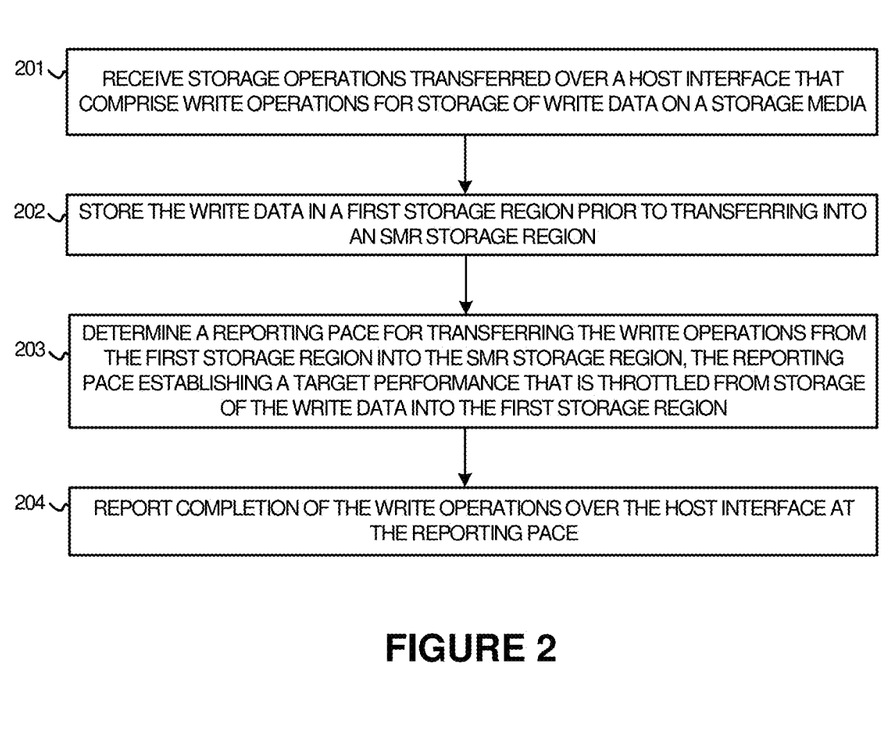
FIG. 2 is a flow diagram illustrating a method of operation of a data storage drive.

To further illustrate the operation of data system 100, FIG. 2 is provided. FIG. 2 is a flow diagram illustrating a method of operating data storage device 110. The operations of FIG. 2 are referenced below parenthetically. In FIG. 2, data storage device 110 receives (201) storage operations transferred by host system 140 that comprise write operations for storage of write data on a storage media. In this example, the storage operations are received by storage control system 120 over storage link 130 and placed into I/O queue 121. These storage operations can comprise read operations or write operations, but in the example discussed in FIG. 2 only write operations are discussed for clarity.

Storage control system 120 stores (202) the write data in a first storage region prior to transferring into a SMR storage region. In FIG. 1, the write data is first cached in first storage region 115 prior to transferring into SMR storage region 116. First storage region 115 and SMR storage region 116 can be on the same storage media, such as in examples using rotating magnetic storage media. However, first storage region 115 can instead be a separate storage medium, such as a solid state storage medium. In some examples, first storage region 115 comprises a "write twice cache" which is used to store write data before writing into SMR storage region 116. Storage of the write data in first storage region 115 is a relatively rapid process, and occurs at a pace that is shown by "caching pace" in FIG. 1, with many write operations being handled in a quick succession. These write operations might be interrupted by read operations, as indicated in FIG. 1, such as when first storage region 115 and SMR storage region 116 are included on the same storage media.

As discussed above, this "caching pace" might present a bursty operation to host system 140 over storage link 130, which might be undesirable in some situations. To aid in a more tempered operation of data storage device 110, storage control system 120 can throttle transfer of the write data from first storage region 115 into SMR storage region 116 or throttle reporting of write completions to host system 140.

Storage control system 120 determines (203) a reporting pace for transferring the write operations from first storage region 115 into SMR storage region 116, the reporting pace establishing a target performance that is tempered from storage of the write data into first storage region 115. The reporting pace tempers out the fast pace of transfer of write data into first storage region 115 by at least managing reporting of write operation completion to host 140 to a pace commensurate with a target performance of data storage device 110. The rate at which write data is transferred into SMR storage region 116 can be modified to occur at the reporting pace in some examples and the reporting to host 140 can occur when the write data is transferred into SMR storage region 116. In other examples, the transfer of write data into SMR storage region 116 can occur decoupled from reporting of the write completions to host 140 at the reporting pace, and transfer of write data into SMR storage region 116 can be performed in bursts.

The reporting pace can be determined based on a projected performance of the transfer of write data into SMR storage region 116 using a projected pace of write operations in light of a current workload of data storage device 110. This projected pace of writes can be based on a historical tracking of storage operations handled by data storage device, which can predict performance or pacing of pending writes in I/O queue 121. A data structure can be employed by storage control system 120 to track properties for past storage operations to establish a running estimation of handling of write data by data storage device 110 and use this running estimation to establish the reporting pace to meet throughput or performance targets. In examples discussed below, such as in FIGS. 5-7, a simulated or projected performance is determined for storage operations which establishes the reporting pace to maintain a consistent target performance of a data storage device as presented to a host system.

Storage control system 120 reports (204) completion of the write operations to host system 140 at the reporting pace. As seen in FIG. 1, although the caching pace is bursty and uneven among writes and reads, the reporting pace is more tempered and steady. This reporting pace allows for host system 140 to see a predictable and consistent performance from data storage device 110. In some examples, performance of data storage device 110 is slowed down from a maximum performance to obtain the reporting pace at the target performance. For example, data storage device 110 might be able to support a first, high, throughput for read and write operations. However, it may be desirable to operate at a second, slower, throughput for various reasons. These reasons may include matching performance of across data storage devices in a data storage system having many data storage devices, or to present a lower performing device to a host when a higher performing device is not desired.

Returning to the elements of FIG. 1, data storage device 110 includes one or more computer readable storage media 111 accessible via one or more read/write heads and associated electromechanical elements. Storage control system 120 is shown as an example of processing circuitry and interfacing elements of data storage device 110. Data storage device 110 can include further elements, such as those discussed for hard disk drive 310 in FIG. 3, although variations are possible. Data storage device 110 can comprise a hard disk drive or other computer readable storage device. The computer readable storage media of data storage device 110 can include rotating magnetic storage media, but can additionally include other media, such as employed in I/O queue 121, or other caches or cache systems of data storage device 110. These other media can include solid state storage media, optical storage media, non-rotating magnetic media, phase change magnetic media, spin-based storage media, or other storage media, including combinations, variations, and improvements thereof. In some examples, data storage device 110 comprises a hybrid hard drive employing solid state storage elements in addition to rotating magnetic storage media. Storage media 113 can employ various magnetic storage schemes, such as shingled magnetic recording (SMR), non-shingled magnetic recording, perpendicular magnetic recording (PMR), including combinations, variations, and improvements thereof.

Host system 140 can include processing elements, data transfer elements, and user interface elements. In some examples host system 140 is a central processing unit of a computing device or computing system. In other examples, host system 140 also includes memory elements, data storage and transfer elements, controller elements, logic elements, firmware, execution elements, and other processing system components. In yet other examples, host system 140 comprises a RAID controller processor or storage system central processor, such as a microprocessor, microcontroller, Field Programmable Gate Array (FPGA), or other processing and logic device, including combinations thereof. Host system 140 can include, or interface with, user interface elements which can allow a user of data storage system 100 to control the operations of data storage system 100 or to monitor the status or operations of data storage system 100. These user interface elements can include graphical or text displays, indicator lights, network interfaces, web interfaces, software interfaces, user input devices, or other user interface elements. Host system 140 can also include interface circuitry and elements for handling communications over bus 130, such as logic, processing portions, buffers, transceivers, and the like.

Bus 130 can include one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof. Although one bus 130 is shown in FIG. 1, it should be understood that one or more discrete links can be employed between the elements of data storage system 100.

Figure 3:
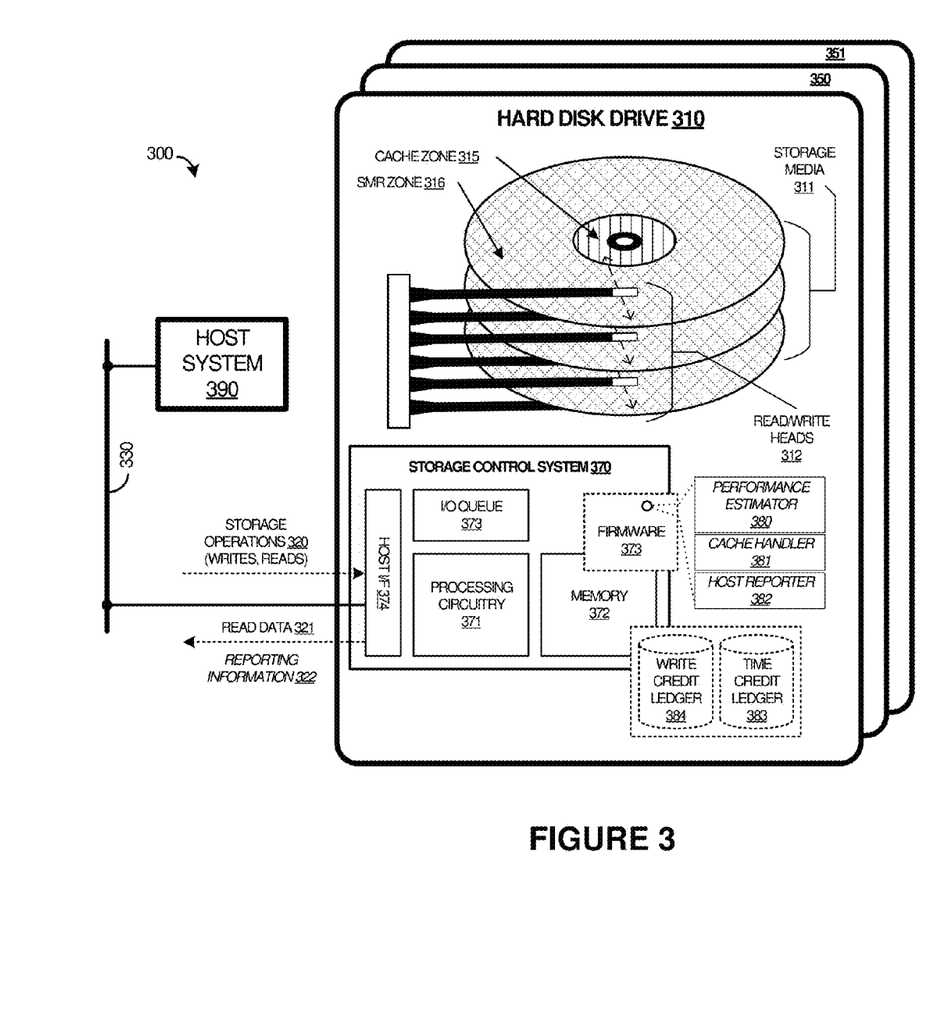
FIG. 3 is a system diagram illustrating a data system.

As a further example data storage system employing a data storage drive, FIG. 3 is presented. FIG. 3 is a system diagram illustrating data storage system 300. Data storage system 300 includes hard disk drive (HDD) 310 and host system 390. HDD 310 and host system 390 communicate over storage link 330. Various elements of HDD 310 can be included in data storage device 110 of FIG. 1, although variations are possible.

Although one HDD 310 is shown in FIG. 3, it should be understood that more than one HDD could be included and linked to host system 390 or other host systems, such as in a data storage environment employing many hard disk drives in an array. As an example of more than one HDD in an array, HDDs 350-351 are included in FIG. 3, and each of HDD 350-351 can include an associated host interface or storage link, such as discussed for link 330.

Storage link 330 can include one or more links, although a combined link is shown in FIG. 3. Storage link 330 can comprise a storage or disk interface, such as Serial Attached ATA (SATA), Serial Attached SCSI (SAS), FibreChannel, Universal Serial Bus (USB), SCSI, InfiniBand, Peripheral Component Interconnect Express (PCIe), Ethernet, Internet Protocol (IP), or other parallel or serial storage or peripheral interfaces, including variations and combinations thereof.

Host system 390 can include one or more computing and network systems, such as personal computers, servers, cloud storage systems, packet networks, management systems, or other computer and network systems, including combinations and variations thereof. In operation, host system 390 issues read and write commands or operations to HDD 310 over storage link 330.

HDD 310 includes storage media 311, R/W heads 312, and storage control system 370. Storage control system 370 includes processing circuitry 371, memory 372, host interface (I/F) 374, and I/O queue 373. It should be understood that other components of HD 310 are omitted for clarity in FIG. 3, such as preamps, amplifiers, motors, armatures, servos, enclosures, and other electrical and mechanical elements. Furthermore, storage control system 370 includes firmware 373 which includes performance estimator 380, cache handler 381, and host reporter 382 which, when executed by at least processing circuitry 371, operates as described below. HDD 350-351 can include similar elements as HDD 310, although variations are possible.

Host interface 374 includes one or more storage interfaces for communicating with host systems, networks, and the like. Host interface 374 can comprise transceivers, interface circuitry, connectors, buffers, microcontrollers, and other interface equipment.

I/O queue 373 includes one or more non-volatile computer readable memory devices. I/O queue 373 can include RAM, SRAM, flash memory, magnetic RAM, phase change memory, resistive random-access memory (ReRAM), among other memory technologies. In some examples, I/O queue 373 is included in one or more non-volatile memory devices. For example, I/O queue 373 can be included in a non-volatile memory device used for caching storage transactions. I/O queue 373 can be included in elements of host interface 374, processing circuitry 371, or memory 372. I/O queue 373 is employed as cache storage operations received over host interface 374, which can include read operations or write operations, along with any associated write data that accompanies the write operations. I/O queue 373 is configured to hold storage operations received over link 330 for handling by storage control system 370.

Storage control system 370 also includes processing circuitry 371 and memory 372. Processing circuitry 371 can comprise one or more microprocessors and other circuitry that retrieves and executes firmware 373 from memory 372. Processing circuitry 371 can be implemented within a single processing device but can also be distributed across multiple processing devices or sub-systems that cooperate in executing program instructions. Examples of processing circuitry 371 include general purpose central processing units, application specific processors, and logic devices, as well as any other type of processing device, combinations, or variations thereof.

Memory 372 can comprise any non-transitory computer readable storage media readable by processing circuitry 371 and capable of storing firmware 373. Memory 372 can include volatile and nonvolatile, removable and non-removable media implemented in any method or technology for storage of information, such as computer readable instructions, data structures, program modules, or other data. In addition to storage media, in some implementations memory 372 can also include communication media over which firmware 373 can be communicated. Memory 372 can be implemented as a single storage device but can also be implemented across multiple storage devices or sub-systems co-located or distributed relative to each other. Memory 372 can comprise additional elements, such as a controller, capable of communicating with processing circuitry 371. Examples of storage media of memory 372 include random access memory, read only memory, magnetic disks, optical disks, flash memory, phase change memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Firmware 373, performance estimator 380, cache handler 381, and host reporter 382 can be implemented in program instructions and among other functions can, when executed by HDD 310 in general or processing circuitry 371 in particular, direct HDD 310 or processing circuitry 371 to operate as described herein. Firmware 373 can include additional processes, programs, or components, such as operating system software, database software, or application software. Firmware 373, performance monitor 380, and cache handler 381 can also comprise software or some other form of machine-readable processing instructions executable by processing circuitry 371. In at least one implementation, the program instructions can include first program instructions that direct storage control system 370 to receive write operations and responsively store write data in a first storage region prior to transferring into a SMR storage region (cache handler 381), determine a reporting pace for transferring the write operations from the first storage region into the SMR storage region (performance estimator 380), and report completion of the write operations to the host system at the reporting pace (host reporter 382), among other operations.

In general, firmware 373 can, when loaded into processing circuitry 371 and executed, transform processing circuitry 371 overall from a general-purpose computing system into a special-purpose computing system customized to operate as described herein. Encoding firmware 373 on memory 372 can transform the physical structure of memory 372. The specific transformation of the physical structure can depend on various factors in different implementations of this description. Examples of such factors can include, but are not limited to the technology used to implement the storage media of memory 372 and whether the computer-storage media are characterized as primary or secondary storage. For example, if the computer-storage media are implemented as semiconductor-based memory, firmware 373 can transform the physical state of the semiconductor memory when the program is encoded therein. For example, firmware 373 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 4:
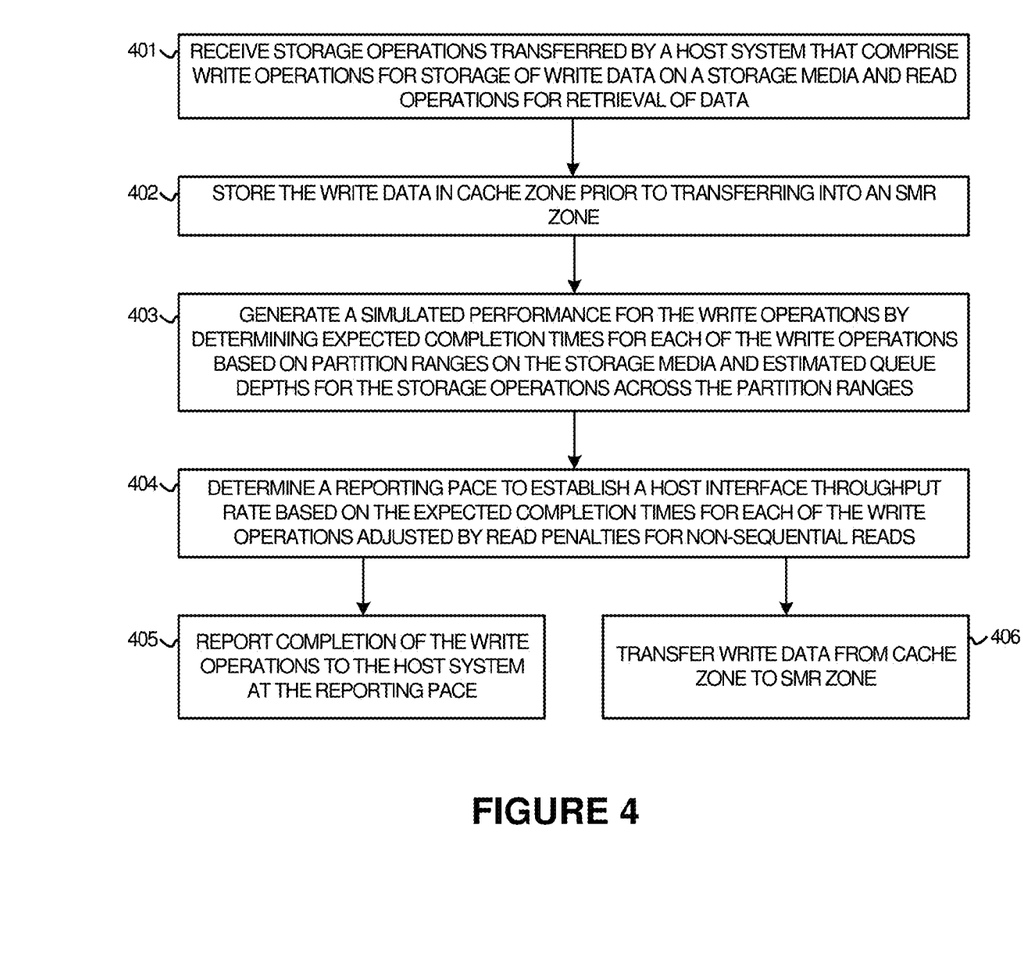
FIG. 4 is a flow diagram illustrating a method of operation of a hard disk drive.

To further illustrate the operation of system 300 and HDD 310, FIG. 4 is presented. FIG. 4 is a flow diagram illustrating a method of operation of HDD 310. The operations of FIG. 4 are referenced below parenthetically. In FIG. 4, HDD 310 receives (401) storage operations 320 transferred by host system 390 that comprise write operations for storage of write data on a storage media and read operations for retrieval of data. The write operations can be accompanied by write data, or HDD 310 might subsequently request write data from host system 390 responsive to receiving a corresponding write operation. Read operations can be for data previously stored by HDD 310, such as data previously written to storage media 311 or for metadata associated with the data which can include filenames, directory/folder listings, or file properties, among other metadata.

Once received over host interface 374, storage operations 320 are placed into I/O queue 373 for staging by storage control system 370 before handling. Out of order execution of the storage operations included in I/O queue can be established for more efficient use of HDD 310 and R/W heads 312.

Storage control system 370 stores (402) write data in cache zone 315 prior to transferring into SMR zone 316. In some examples, first storage region 315 comprises a "write twice cache" which is used to store write data before writing into SMR zone 316. When the storage operations are write operations, associated write data is staged into cache zone 315 of storage media 311 before committing into SMR zone 316. This staging process into cache zone 315 can occur quickly after receipt of write data over host link 330. The rapid staging into cache zone 315 might normally present a bursty operation to host system 390 for random write operations which might be undesirable for host system 390, as discussed above in other examples. Therefore, instead of reporting completion of random write operations when write data is staged into cache zone 315, write completion reporting to host system 390 is tempered by using a simulated performance separate from data operations of HDD 310. In further examples, a write cache is employed that is not on storage media 311, such as in hybrid hard drives that employ solid-state write caches which can comprise volatile or non-volatile memory devices. In examples with a separate write cache, the write data can be staged into the separate write cache instead of cache zone 315, and the write data is later de-staged or committed to SMR zone 316 from the separate write cache. The techniques discussed herein apply to devices that employ cache zone 315 or to devices with separate write caches.

Storage control system 370 generates (403) a simulated performance for the write operations by determining expected completion times for each of the write operations based on partition ranges on the storage media and estimated queue depths associated with the storage operations across the partition ranges. A current one of the write operations is identified for simulated performance from the top of a first-in-first-out (FIFO) data structure, such as FIFO 510 of FIG. 5, which indicates that an estimated completion time is being determined for target operation 511. Newly received write operations are introduced into FIFO 510 on the 'left' side in FIG. 5. Examples of the simulated performance can be seen in FIGS. 5-7, which are discussed below.

Partition ranges are identified for each write operation currently being handled in the simulated performance. The partition ranges are used to categorize write operations into one of several angular sweep ranges for R/W heads 312 over storage media 311, and will be discussed in more detail below. It should be noted that partition ranges are unrelated to user-facing logical partitions used to assign drive letters to storage portions or to logically subdivide a larger storage area into smaller areas for use in file system operations of host system 390 or other associated end user data systems.

The estimated queue depths are used to estimate a queue depth used for host interface 374, such as estimating a depth of I/O queue 373 without knowledge of the actual queue depth employed. Many times host system 390 can adjust a queue depth for HDD 310 on-the-fly and storage control system 370 might not have visibility to that queue depth. Therefore, storage control system 370 can estimate the queue depths, and this will be discussed in more detail below.

Using at least the partition ranges and estimated queue depth, storage control system 370 can determine an estimated completion time for any particular random write operation. A random write comprise a write to a non-deterministic or random location of storage media 311, and is differentiated from a sequential write which occurs in conjunction with several other write operations to a similar location on storage media 311. Random write performance of HDD 310 depends in large part on how far R/W heads 312 have to move to find the correct track/block for the write operation as well as a queue depth currently being employed for storage operations of host system 390. Therefore, to estimate write performance, a running history of partition sizes and queue depths can be maintained by storage control system 370.

Many times, a host system will have one or more processes, such as applications, which store and retrieve data in temporal and physical proximity on storage media 311. For example, a first application executed on host system 390 (or a first process on another data system that uses host system 390 to store/retrieve data) might store and retrieve data within a small angular sweep range of R/W heads 312 due to having storage blocks that are proximate to each other for that application. This angular sweep range is referred to herein as a partition range. In non-rotating storage media, a partition range might instead include a range of memory blocks or addresses that are proximate to each other on the storage media.

To determine the partition ranges for each write operation, storage control system 370 maintains a data structure that relates counts of a predetermined number of past storage operations made to a plurality of sub-portions of the storage media. Storage control system 370 can identify a partition range using this data structure for a current write operation based on a threshold window that spans one or more of the sub-portions of the storage media proximate to a storage location of the current one of the write operations.

Figure 5:
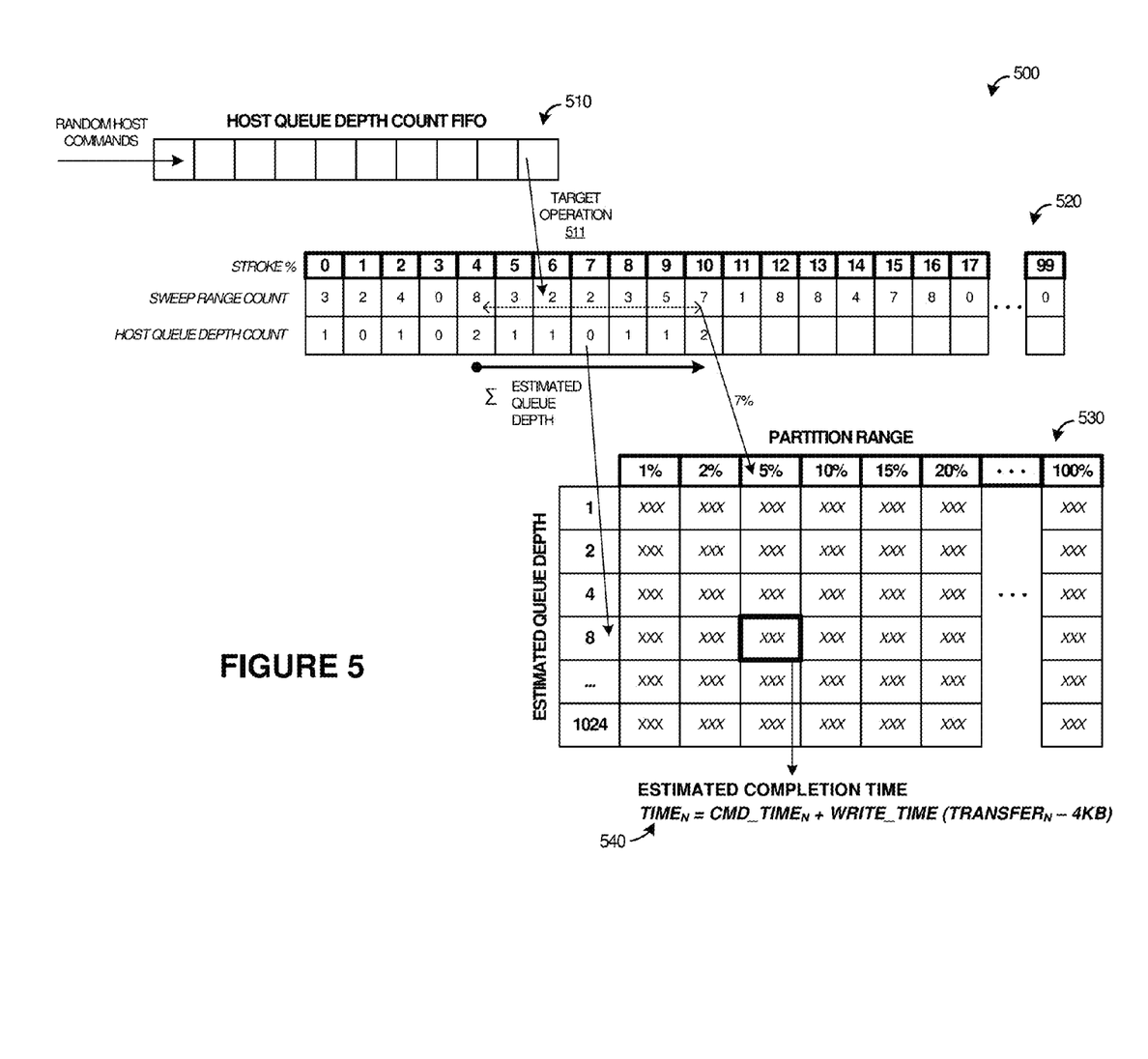
FIG. 5 is a diagram illustrating performance estimation tables.

For example, in FIG. 5, table 520 can be established to identify the partition ranges. Table 520 subdivides storage media 311 into 100 sub-portions, with each sub-portion representing a small angular sweep range for R/W heads 312. If the angular sweep range of R/W heads 312 is equal to "X" then each column in table 520 represents an angular range of X/100. This stroke % of table 520 can represent a corresponding number of block addresses to subdivide storage media 311 into many consecutive block address ranges. A running count of storage operations made to each sweep range is tallied in the "sweep range count" of table 520. For example, table 520 can tally the last 'Y' number of storage operations, such as the last 1024 or 512 storage operations, among other values. The last quantity of storage operations can be monitored by table 520 to record which position on storage media 311 that each storage operation was directed to, based on an associated angular position of R/W heads 312 over storage media 311. As a specific example, target operation 511 is shown as directed to stroke % column 6 by comparing a block address associated with target operation 511 to a stroke % for storage media 311. As indicated in table 520, stroke % column 6 has had two previous storage operations (writes or reads) in the past 'Y' number of storage operations.

A threshold window can then be used to identify a partition range associated with target operation 511. This threshold window can be used to identify in table 520 where the number of past storage operations reduces in number past a certain point. For example, the threshold might be set to '1' and table 520 is searched on either side of column 6 to identify when the number of past storage transactions falls below the threshold number. In FIG. 5, this window is shown to span column 4 to column 10 since column 3 indicates '0' past storage operations and column 10 indicates '1' past storage operations. Thus, target operation 511 is associated with a particular partition range indicated by seven columns 4-10, which corresponds to a sweep range of 7%. This sweep range for target operation 511 is then used as a column identifier to lookup an estimated performance in table 530.

However, an estimated queue depth must also be determined for target operation 511 that corresponds to a particular row of table 530. It should be noted that table 530 only has a finite number of entries, and thus when values for a target command fall in-between rows or columns then an interpolation process can be performed to determine an estimated completion time. Alternatively, the row or column can be selected by rounding a partition rage or queue depth for a particular target operation to a nearby column or row.

To determine the estimated queue depth for target operation 511, storage control system 370 is configured to identify the estimated queue depth for target operation 511 across the partition range for target operation 511 by establishing a count of recent storage operations received for each of the stroke % columns over the partition range, and summing the count of the recent storage operations over the partition range. As seen in table 520 of FIG. 5, the partition range is from column 4 to column 10. Summing entries in the "host queue depth count" row across this partition range leads to an estimated queue depth of 8. The count used for host queue depth count typically includes a smaller amount of past storage operations than the sweep range count. For example, if the sweep range count corresponds to the last 1024 or 512 storage operations, then the host queue depth count might correspond to the last 10 storage operations. The quantity of past storage transactions counted in the host queue depth count row might correspond to the FIFO depth used in FIFO 510, although other quantities can be used including quantities that are adjusted during operation.

Once the estimated queue depth is determined, then both a row (estimated queue depth) and column (partition range) correspond to an estimated completion time entry in table 530 for target operation 511. The partition range and the estimated queue depth are used as an index to a table 530 relating estimated completion times to partition ranges and estimated queue depths for HDD 310. The estimated completion times can be precomputed for HDD 310 based on an average completion time for an exemplary random write operation in context of each of the values of the partition ranges and the estimated queue depths. In further examples, the estimated completion times can be calculated on-the-fly instead of employing a lookup table of precomputed values.

If the write operations correspond to write data sizes larger than a pre-computed size, then additional time for the larger data sizes can be included. For example, equation 540 shown in FIG. 5 might be used to pre-compute entries for each row-column combination in table 530 based on a 4 kilobyte (KB) write size. If the current write (e.g. target write command 511) corresponds to write data larger than 4 KB, then this additional size is taken into account using equation 540.

Once an estimated completion time is determined for a particular write operation, such as for target write command 511, then storage control system 370 can use this estimated completion time in a simulated write process used to establish the reporting pace over storage link 330.

Figure 6:
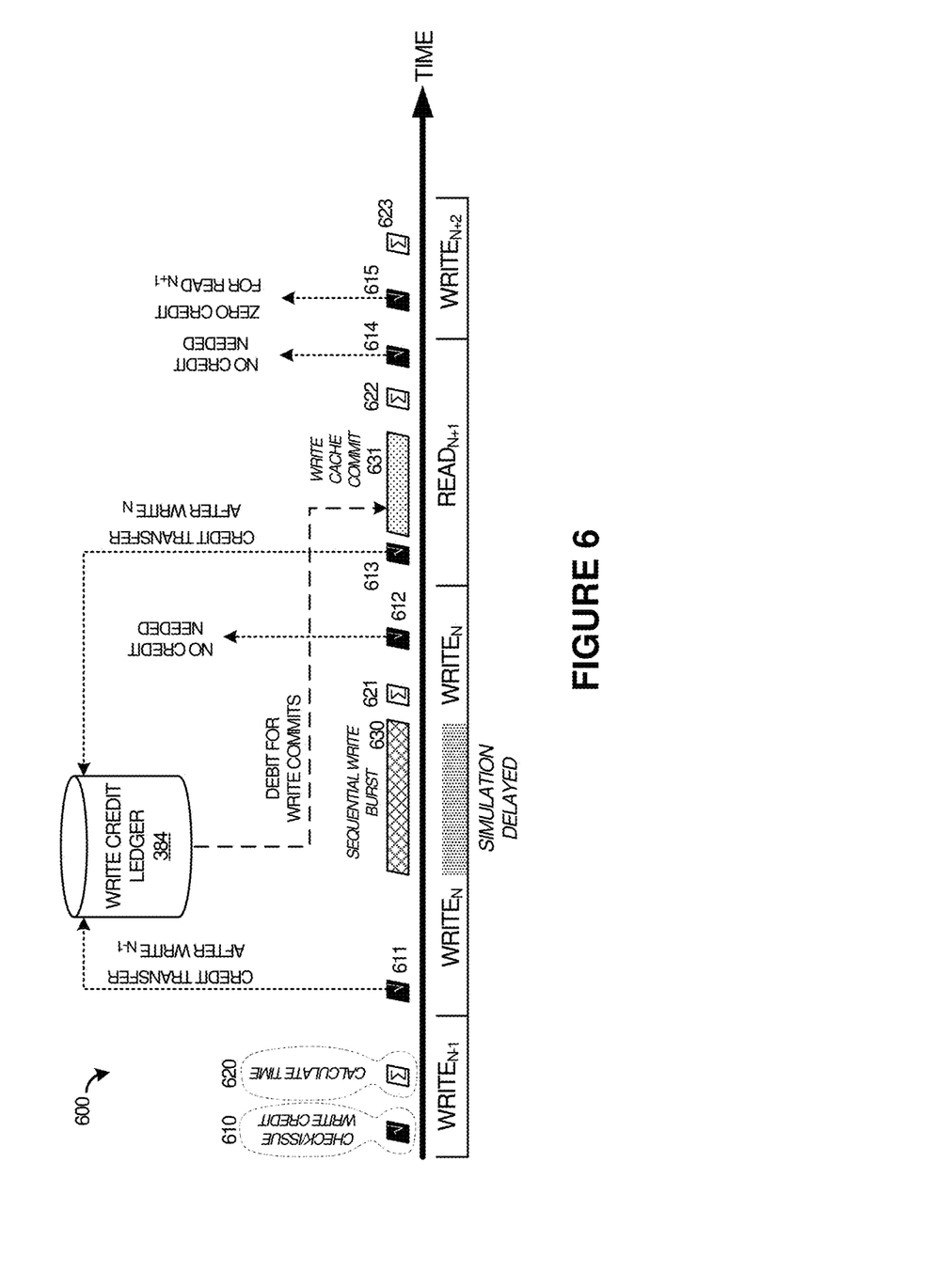
FIG. 6 is a diagram illustrating a write credit procedure for a hard disk drive.

As one example simulation process, FIG. 6 is presented. FIG. 6 includes graph 600 which indicates a timeline for a simulated write process that covers an example timeline of writes and reads, specifically $write_{n-1}$, $write_n$, $read_{n+1}$, and $write_{n+2}$. It should be noted that $write_{n-1}$, $write_n$, and $write_{n+2}$ are random writes in this example. Write and read durations are indicated below the timeline as bracketed timespans. Writes can be reported to host system according to the simulated bracketed timespans for each write, such as at a beginning of each write timespan or at the end of each write timespan.

Periodic write time credits can be tracked after a write has occurred and periodic estimated write times are calculated. At time 610 a write credit is issued or checked. In some cases, a write credit is not needed to be made, such as when a random write has not previously occurred since the last write credit has been issued to ledger 384. Assuming that no write credit is needed at time 610, then no write credit is issued into ledger 384. At time 620, an estimated completion time is calculated for a write, specifically for the next write to be included in the timeline, which is $write_n$ in FIG. 6. Next, at time 611 a write credit is checked to see if a credit should be issued, and since $write_{n-1}$ has just occurred in the simulated timeline then a credit is issued into ledger 384 that corresponds to the estimated completion time for $write_{n-1}$.

After the completed simulation of $write_{n-1}$, then the simulation of $write_n$ occurs. In the case of $write_n$, a sequential write burst 630 interrupts the simulation during the performance of the sequential write burst. A sequential write burst is a series of write operations that are received by HDD 310 which correspond to a sequential storage location and can be burst to SMR zone 316 without caching or tempering in the associated reporting. This can be preferred when a large burst of write operations are performed at a particular instance in time by host 390 instead of random singular write operations. Once the sequential write burst has completed, then the simulation can resume.

At time 621, another estimated completion time is calculated, in this case for the next write, namely $write_{n+2}$. At time 612 a write credit is checked, and since no write had completed since the last write credit check, then no credit is issued. At time 613 another write credit is checked, and since $write_n$ completed since the last write credit check, then a write credit is issued to ledger 384.

Eventually, enough write credits have been issued and write cache commit process 631 is prompted. Write cache commit process 631 is a burst operation that transfers (406) pending write data associated with write operations from cache zone 315 into SMR zone 316. Although in some examples the write data can be transferred from cache zone 315 into SMR zone 316 as the bracketed timespans in the simulation indicates for each write operation, in this example a burst is used to transfer groups of write data into SMR zone 316. A trigger condition can initiate write cache commit process 631, such as when a fullness of cache zone 315 reaches a fullness threshold. Other trigger conditions can include when enough write time credits have been issued into ledger 384 to exceed a time credit threshold. Once write cache commit process 631 occurs, then ledger 384 subtracts time credits corresponding to the write operations that are completed by write cache commit process 631.

As mentioned above, reporting of completion of write operations (405) to host system 390 can occur commensurate with the bracketed timespans based on the simulation times of writes shown in FIG. 6, or can instead occur once the write data has been transferred into SMR zone 314 by write cache commit process 631.

At time 622, another estimated completion time is calculated, in this case for a later write which isn't shown in FIG. 6. At time 614 a write credit is checked, and since no write had completed since the last write credit check, then no credit is issued. At time 615 a write credit is checked, and since a read had last occurred, then no credit is issued. At time 623, an estimated completion time is calculated for a write, specifically for the next write to be included in the timeline, which not shown in FIG. 6. Simulations such as in FIG. 6 can continue for further write operations.

Figure 7:
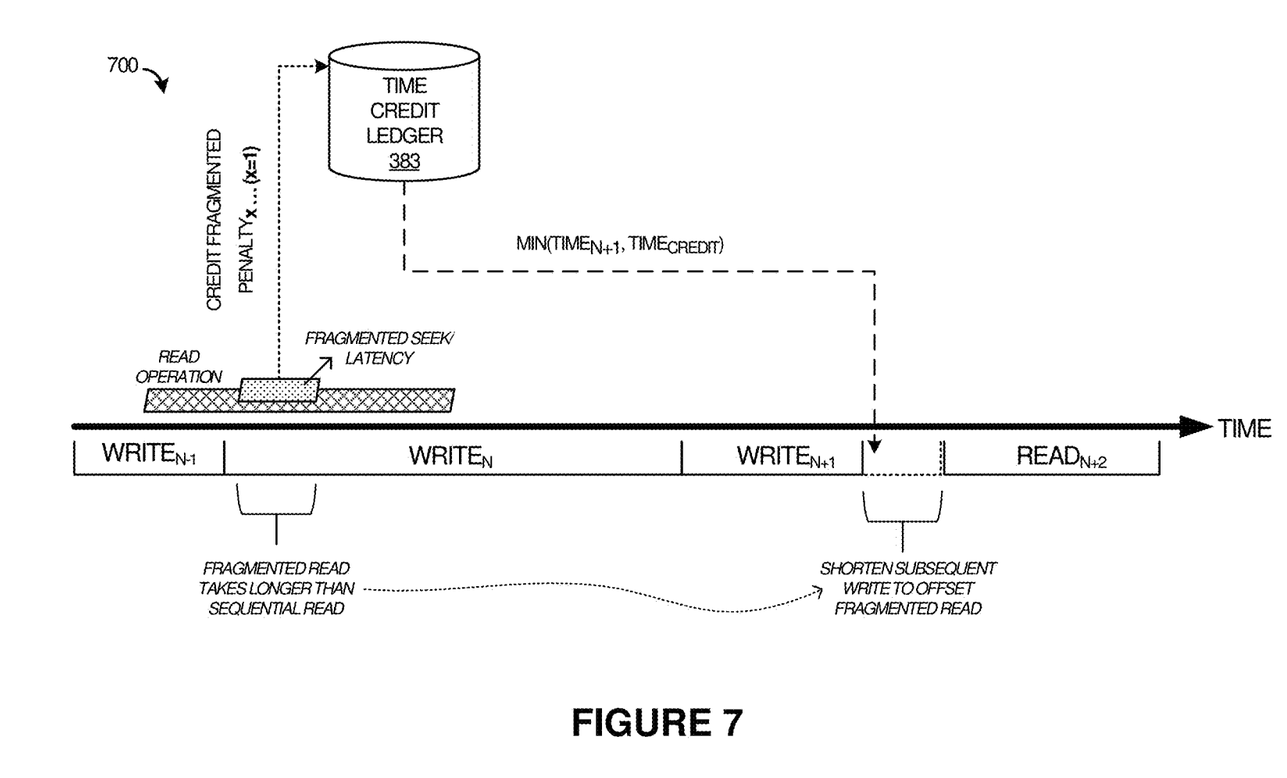
FIG. 7 is a diagram illustrating a read credit procedure for a hard disk drive.

Storage control system 370 determines (404) a reporting pace to establish a host interface throughput rate based on the expected completion times for each of the write operations adjusted by read penalties for non-sequential reads. As with the simulated write operations seen in FIG. 6, an accounting of read operations can also be considered when establishing the reporting pace. FIG. 7 illustrates an example accounting of read operations for HDD 310.

When the storage operations are read operations, the read operations are typically performed at a pace of receipt from host system 390. Usually, read data is desired to be retrieved from storage media 311 and transferred to host system 390 as quickly as possible to reduce latencies and operational delays for host system 390. However, when data targeted to be read is already stored in SMR zone 316, read operations of at least two types can occur. A first type is a sequential read, where target data to be read is stored in physically sequential blocks in SMR zone 316. In this first type of read, the read can be performed relatively quickly and without interruption once R/W heads 312 are positioned over the first data block corresponding to the target data to be read. A second type of read is a non-sequential read, or fragmented read, where target data to be read is stored in blocks in SMR zone 316 which are not physically sequential, and thus R/W heads 312 must be positioned more than once to read all of the target data, adding latency due to seek times of R/W heads 312. The repositioning of R/W heads 312 adds delay into the retrieval of all of the target read data, and can slow down performance of HDD 310 as presented to host system 390. It should be understood that reads can occur in combinations of sequential and non-sequential blocks.

Returning to FIG. 7, read operations are shown as occurring with at least a portion thereof corresponding to non-sequential read operations. This can be referred to as a fragmented read, where data to be read from storage media 311 is scattered over non-sequential storage locations and R/W heads 312 must be repositioned mid-read or mid-burst of read operations. Time credit ledger 383 can be established as a data structure to monitor penalties for fragmented reads. These time penalties can be used to shorten later write simulated times to offset the time penalty for the fragmented read operations. Specifically, in FIG. 7, a duration for $write_{n+1}$ is shortened by the amount of penalty from the previous fragmented read. The reporting pace can be thus established to shorten write reporting delays to offset increased delays from fragmented reads and maintain a consistent throughput that is presented to host system 390. Although time credit ledger 383 is shown as separate from ledger 384 in FIG. 3, in other examples these are included in the same ledger or associated data structures.

Storage control system 370 reports (405) completion of the write operations to the host system at the reporting pace. Based on the simulated performance of write operations, the reporting pace is established and a target performance is presented by HDD 310 to host system 390. For example, if the target performance is desired to be slower than a potential throughput of HDD 310, then the reporting pace can be established to slow down the performance of HDD 310 to meet the target performance. In other examples, random write operations are too "bursty" as observed by host system 390, and a tempered operation by HDD 310 is desired, then tempered operation can include a reporting pace that reports write completions decoupled from actual writing of data into cache zone 315 or SMR zone 316. This decoupling can establish a throttled reporting of status with regards to write operations received by HDD 310 to steady or temper reporting of write completions and present a more consistent completion rate to host system 390.

In examples where many storage devices are employed, such as an array of HDDs or a large data center, the tempered reporting discussed herein can enhance the operation of existing or new data storage devices. Consistent write reporting can lead to more predictable performance which can aid host systems in various storage operations. A consistent throughput presented to a host system (or multiple host systems) regarding write operations can be established across many storage devices. For example, a plurality of data storage devices can be configured to operate as discussed herein to normalize or equalize performance across each other, such as to provide a consistent or matched throughput for each of the plurality of data storage devices. These data storage devices can be preconfigured to operate with a predetermined performance that is presented to a host, or can be configured during operation to modify or alter performance targets. Additionally, when new or replacement data storage devices are installed, the tempered performance techniques discussed herein can be used to match performance of the new or replacement devices to that of existing data storage devices. In further examples, backwards compatibility of data storage devices can be achieved by the tempered performance which can be employed to match performance of older models or type of data storage drives even though a faster or more bursty operation might normally be experienced by a new or replacement device. In yet further examples, equalization or normalization of characteristics of various data storage devices comprising different brands, speeds, or types can be achieved using the tempering discussed herein.

To coordinate matched, equalized, or normalized performance across multiple data storage devices, such as many HDDs in a storage array, throughput matching instructions can be transferred to each device. A system external to each HDD can transfer a target performance indicator over a storage link to the data storage devices. For example, in the example shown in FIG. 3, host system 390 can transfer throttling instructions to each HDD (310 and 350-351) shown in FIG. 3 over an associated storage link. These throttling instructions can include a target performance for each HDD, such as an indicator in input/output operations per second (IOPS), bits per second, or a target performance using any other associated metric. In further examples, each HDD can transfer an indication of a peak or maximum performance for delivery to host system 390, and host system 390 can identify a target performance for each HDD to meet and transfer the target performance to each HDD for tempering performance as discussed herein.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage device, comprising:
   storage media comprising a first storage region and a shingled magnetic recording (SMR) storage region;
   a storage control system configured to receive storage operations over a host interface that comprise write operations for storage of write data on the storage media and responsively store the write data in the first storage region prior to transferring into the SMR storage region;
   the storage control system configured to determine a reporting pace associated with transferring the write operations from the first storage region into the SMR storage region, the reporting pace establishing a target performance over the host interface that is tempered from a storage pace of storing the write data into the first storage region; and
   the storage control system configured to report completion of the write operations over the host interface at the reporting pace.

2. The data storage device of claim 1, comprising:
   the storage control system configured to store the write data in the first storage region without reporting completion of the write operations over the host interface, wherein the write data is stored in the first storage region at a pace that is faster than the reporting pace.

3. The data storage device of claim 1, comprising:
   the storage control system configured to generate a simulated performance for the write operations to establish the reporting pace.

4. The data storage device of claim 3, comprising:
   the storage control system configured to generate the simulated performance for the write operations by determining expected completion times for each of the write operations based at least in part on a partition range on the storage media and an estimated queue depth for the storage operations across the partition range; and
   the storage control system configured to establish the reporting pace based at least in part on the expected completion times for each of the write operations.

5. The data storage device of claim 4, comprising:
   the storage control system configured to maintain a data structure that relates counts of a predetermined number of past storage operations made to a plurality of sub-portions of the storage media;
   the storage control system configured to identify the partition range for a current one of the write operations based on a threshold window that spans one or more of the plurality of sub-portions proximate to a storage location of the current one of the write operations.

6. The data storage device of claim 5, comprising:
   the storage control system configured to identify the estimated queue depth for the storage operations across the partition range by establishing a count of recent storage operations received for the plurality of sub-portions of the storage media and summing the count of the recent storage operations over the partition range.

7. The data storage device of claim 4, comprising:
the storage control system configured to determine the expected completion times for each of the write operations by using the partition range and the estimated queue depth for each of the write operations as an index to a data structure relating the estimated completion times to a plurality of partition ranges and a plurality of estimated queue depths for the data storage device.

8. The data storage device of claim 7, wherein the estimated completion times are precomputed for the data storage device based on an average completion time for an exemplary random write operation in context of each of the values of the plurality of partition ranges and the plurality of estimated queue depths.

9. The data storage device of claim 1, wherein the storage operations transferred over the host interface further comprise read operations for retrieval of data stored on the storage media; and comprising:
the storage control system configured to identify when ones of the read operations are directed to data stored non-sequentially in the SMR storage region, responsively determine time penalties for the ones of the read operations and use the time penalties to shorten completion times of selected write operations to maintain the reporting pace.

10. A method of operating a data storage device, the method comprising:
receiving storage operations transferred over a host interface that comprise write operations for storage of write data on the storage media and responsively storing the write data in a first storage region of the storage media prior to transferring into a SMR storage region of the storage media;
determining a reporting pace for reporting transfer of the write operations from the first storage region into the SMR storage region, the reporting pace establishing a target performance over the host interface that is tempered from a storage pace of storing the write data into the first storage region; and
reporting completion of the write operations over the host interface at the reporting pace.

11. The method of claim 10, further comprising:
storing the write data in the first storage region without reporting completion of the write operations over the host interface, wherein the write data is stored in the first storage region at a pace that is faster than the reporting pace.

12. The method of claim 10, further comprising:
generating a simulated performance for the write operations to establish the reporting pace.

13. The method of claim 12, wherein generating the simulated performance for the write operations comprises determining expected completion times for each of the write operations based at least in part on a partition range on the storage media and an estimated queue depth for the storage operations across the partition range; and further comprising:
establishing the reporting pace based at least in part on the expected completion times for each of the write operations.

14. The method of claim 13, further comprising:
maintaining a data structure that relates counts of a predetermined number of past storage operations made to a plurality of sub-portions of the storage media;
identifying the partition range for a current one of the write operations based on a threshold window that spans one or more of the plurality of sub-portions proximate to a storage location of the current one of the write operations.

15. The method of claim 14, further comprising:
identifying the estimated queue depth for the storage operations across the partition range by establishing a count of recent storage operations received for the plurality of sub-portions of the storage media and summing the count of the recent storage operations over the partition range.

16. The method of claim 13, further comprising:
determining the expected completion times for each of the write operations by using the partition range and the estimated queue depth for each of the write operations as an index to a data structure relating the estimated completion times to a plurality of partition ranges and a plurality of estimated queue depths for the data storage device.

17. The method of claim 16, wherein the estimated completion times are precomputed for the data storage device based on an average completion time for an exemplary random write operation in context of each of the values of the plurality of partition ranges and the plurality of estimated queue depths.

18. The method of claim 10, wherein the storage operations transferred over the host interface further comprise read operations for retrieval of data stored on the storage media; and further comprising:
identifying when ones of the read operations are directed to data stored non-sequentially in the SMR storage region, responsively determining time penalties for the ones of the read operations and use the time penalties to shorten completion times of selected write operations to maintain the reporting pace.

19. A data storage system, comprising:
a plurality of data storage devices configured to receive storage operations for storage and retrieval of data on associated storage media, each of the associated storage media comprising a magnetic recording (SMR) storage region;
each of the plurality of data storage devices comprising:
a storage control system configured to receive associated storage operations transferred by a host system that comprise write operations for storage of write data on the storage media and responsively store the write data in a first storage region prior to transferring into the SMR storage region;
the storage control system configured to determine a reporting pace for reporting transfer of the write operations from the first storage region into the SMR storage region, the reporting pace establishing a target performance that is tempered from a storage pace of storing the write data into the first storage region to normalize performance across ones of the plurality of data storage devices; and
the storage control system configured to report completion of the write operations at the reporting pace.

20. The data storage system of claim 19, comprising:
the storage control system configured to generate a simulated performance for the write operations by determining expected completion times for each of the write operations based at least in part on a partition range on the storage media and an estimated queue depth for the storage operations across the partition range; and the storage control system configured to establish the reporting pace based at least in part on the expected completion times for each of the write operations.

\* \* \* \* \*